United States Patent [19]
Schiesser

[11] Patent Number: 5,246,346
[45] Date of Patent: Sep. 21, 1993

[54] HYDRAULIC POWER SUPPLY

[75] Inventor: Robert R. Schiesser, Webster, N.Y.

[73] Assignee: Tri-Line Corporation, Tonawanda, N.Y.

[21] Appl. No.: 937,505

[22] Filed: Aug. 28, 1992

[51] Int. Cl.[5] ............................................. F04B 17/00
[52] U.S. Cl. ................................................. 417/363
[58] Field of Search ......................... 417/363, 360, 361

[56] References Cited

U.S. PATENT DOCUMENTS

| | | | |
|---|---|---|---|
| 1,082,183 | 12/1913 | Vernon | 417/360 |
| 2,863,602 | 12/1958 | Chapin | 417/363 X |
| 4,768,930 | 9/1988 | Grime et al. | 417/363 X |
| 5,040,953 | 8/1991 | Tinsler | 417/363 |

Primary Examiner—Richard E. Gluck
Attorney, Agent, or Firm—Howard J. Greenwald

[57] ABSTRACT

A hydraulic power supply is disclosed. This power supply contains a reservoir, an electric motor, and a variable volume pressure compensated pump. The motor used in the device rotates at a speed which does not exceed 1,200 revolutions per minute and produces from about 3 to about 5 horsepower and a torque of from about 12 to about 30 foot pounds. The ratio of the torque to the horsepower (in foot-pounds per horsepower) does not exceed about 4.0. The hydraulic power supply includes an adaptor for connecting the electric motor and the pump and for suspending the electric motor and the pump away from at least one wall of the reservoir.

12 Claims, 9 Drawing Sheets

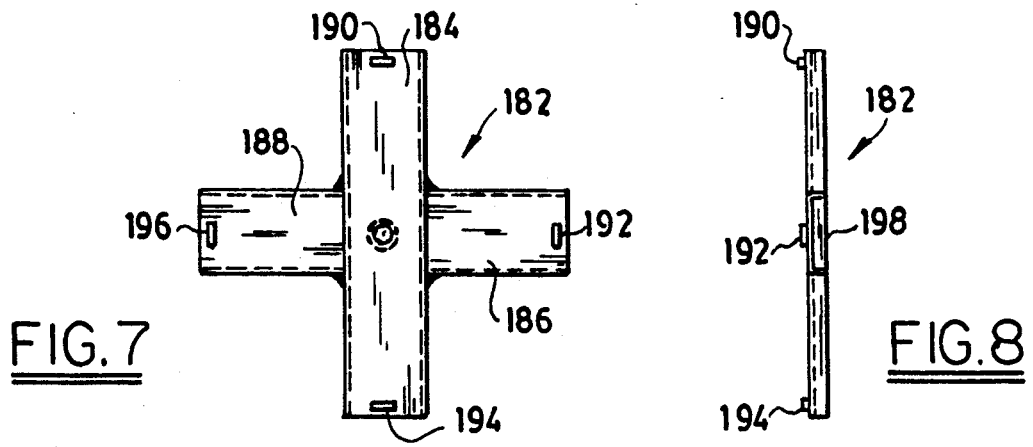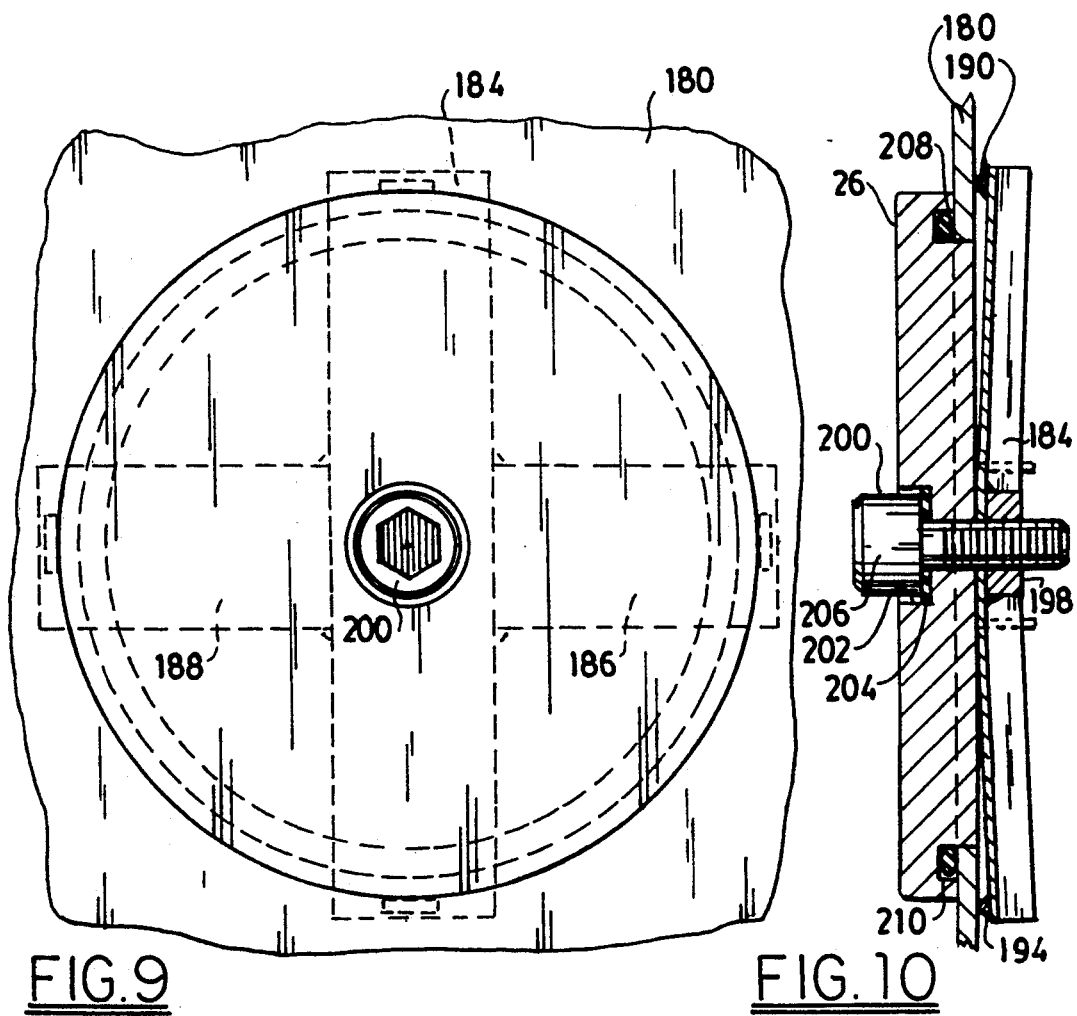

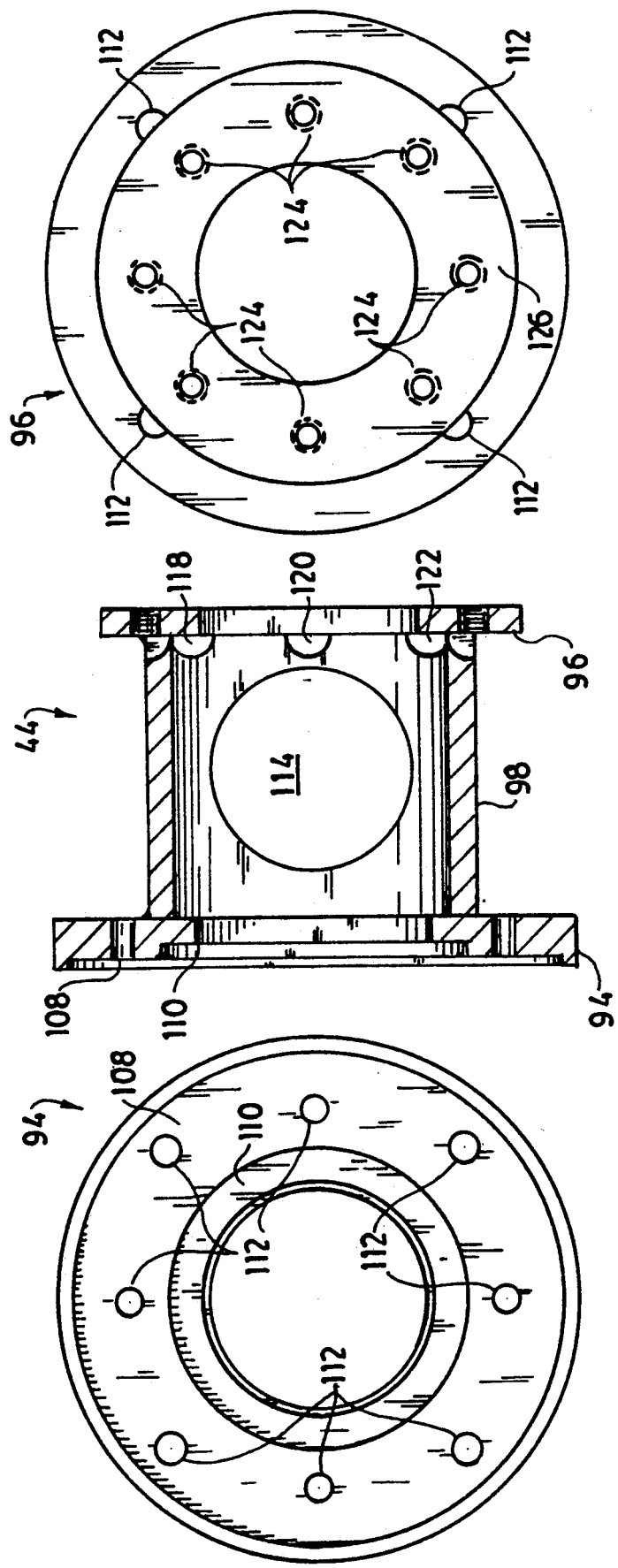

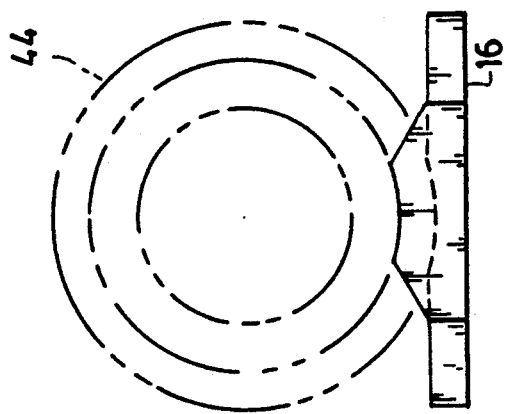
FIG. 14
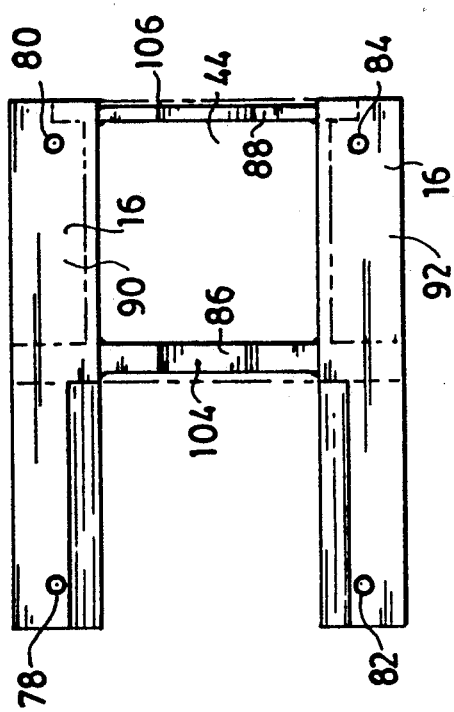
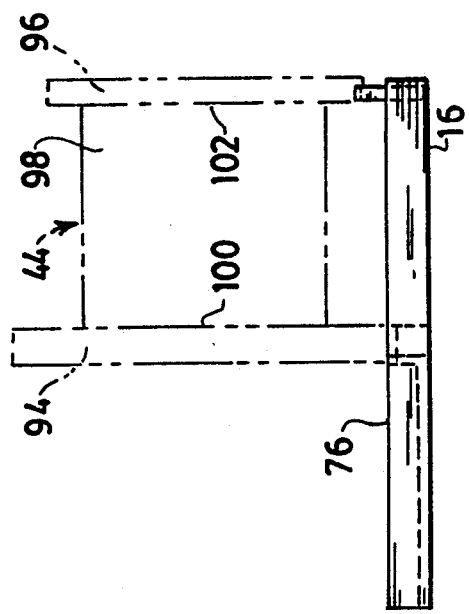
FIG. 16
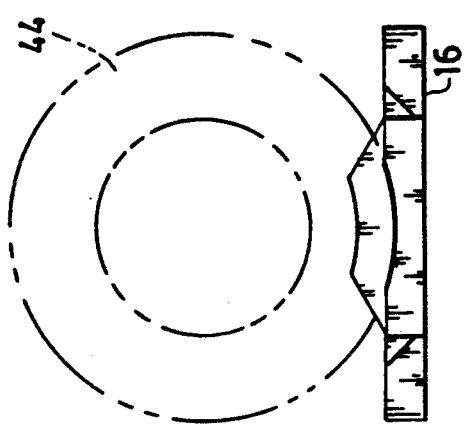
FIG. 15

5,246,346

HYDRAULIC POWER SUPPLY

FIELD OF THE INVENTION

A hydraulic power supply is disclosed.

BACKGROUND OF THE INVENTION

Hydraulic power supplies are well known; they are used to provide fluid under specified pressure and flow conditions. In general, these power supplies contain a motor, a hydraulic pump, and various fluid conduits.

One well known problem with hydraulic systems is that they generate a substantial amount of noise. Many prior art patents have been addressed to the problems of reducing such noise.

In U.S. Pat. No. 5,044,762, a mixer apparatus for a high horsepower mixer application is disclosed in which mixer components of large weight and size are supported. The device contains a noise containment enclosure on its base. The apparatus of this patent, however, is relatively large and bulky, and, thus, is not suitable for situations in which space is at a premium.

The Occupational Safety and Health Administration ("OSHA") has promulgated regulations regarding the amount of noise industrial machinery may produce. It thus is important to provide hydraulic systems which minimize the amount of noise the produce.

It is an object of this invention to provide a hydraulic power supply which is relatively compact.

It is another object of this invention to provide a hydraulic power supply which is at least 6 decibels quieter than conventional hydraulic power supplies.

It is yet another object of this invention to provide a hydraulic power supply equipped with means adapted to allow the ready mounting or dismounting of various motors on the supply.

It is yet another object of this invention to provide a hydraulic power supply adapted to allow the ready mounting or dismounting of various pumps on the supply.

It is yet another object of this invention to provide a hydraulic power supply which can be serviced by access to only one side of such supply.

It is yet another object of this invention to provide a hydraulic power supply which provide substantially fewer contaminants to its working environment than prior art power supplies.

It is yet another object of this invention to provide a process for operating a power supply at a substantially reduced noise level.

SUMMARY OF THE INVENTION

In accordance with this invention, there is provided a hydraulic power supply which is comprised of an electric motor, a pump, a hydraulic reservoir comprised of a top plate, and means for suspending the motor and the pump above the top plate of the reservoir. The motor used in the power supply rotates its output shaft at a speed of 1200 r.p.m. or less. The pump used in the power supply is a variable volume pressure compensated pump.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 7 is front view of a spider assembly used to retain the clean out cover of the supply of FIG. 1;

FIG. 8 is a side view of the spider assembly of FIG. 7;

FIG. 9 is a front view of the clean out cover assembly of the supply of FIG. 1;

FIG. 10 is a side view of the assembly of FIG. 9;

FIG. 11 is a front view of the a motor mounting adaptor used in the supply of FIG. 1;

FIG. 12 is a side view of the adaptor of FIG. 11;

FIG. 13 is an end view of the adaptor of FIG. 11;

FIG. 14 is a top view of an adaptor frame used in the supply of FIG. 1;

FIG. 15 is an end view of the adaptor frame of FIG. 14;

FIG. 16 is a side view of the adaptor frame of FIG. 14; and

FIG. 17 is another end view of the adaptor frame of FIG. 14.

DESCRIPTION OF THE PREFERRED EMBODIMENTS

Figure 1:
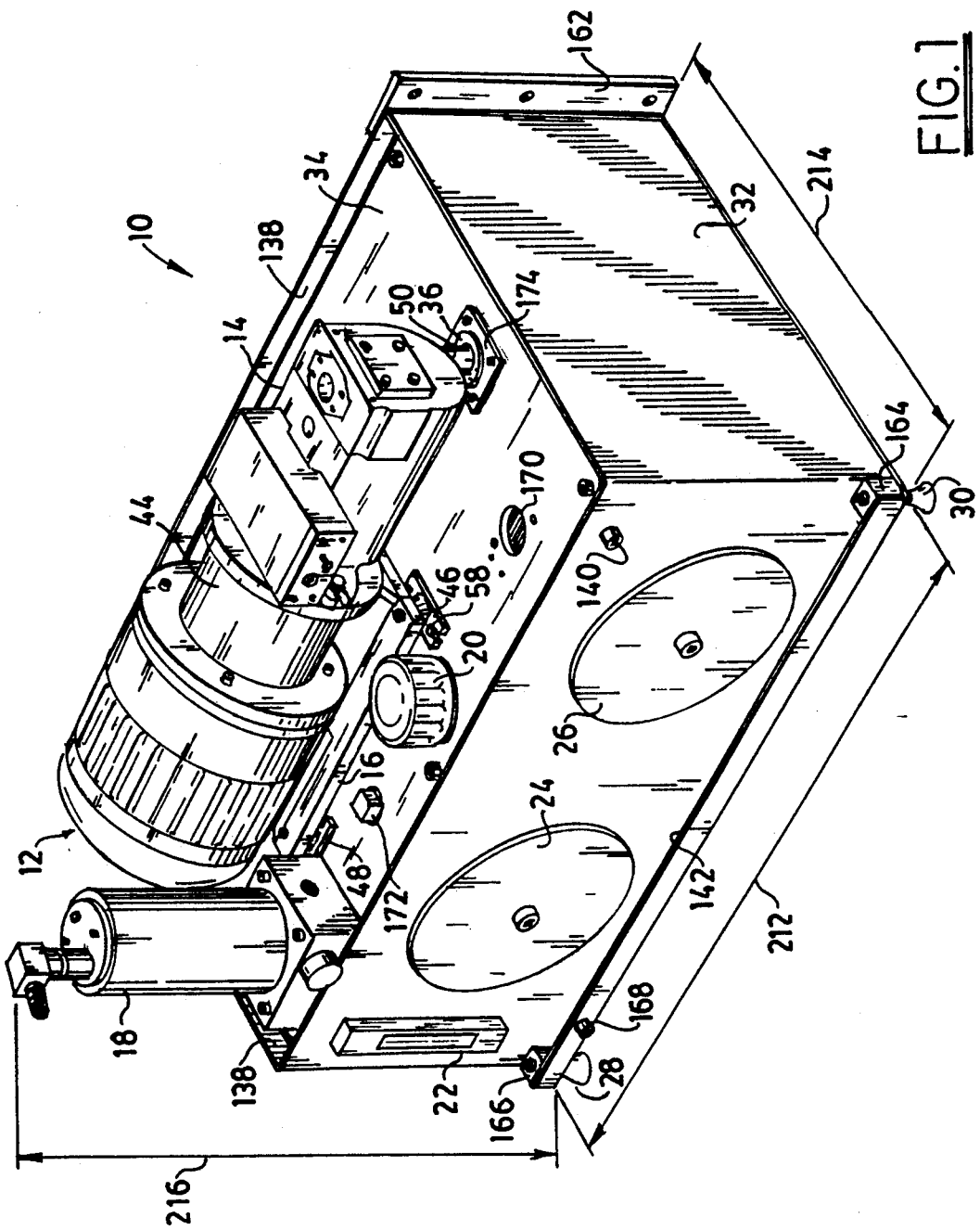
FIG. 1 is a perspective view of one preferred hydraulic power supply of the invention.

FIG. 1 is a perspective view of one preferred embodiment of the hydraulic power supply 10 of this invention. Referring to FIG. 1, it will be seen that hydraulic power supply 10 is comprised of motor 12, pump 14, mounting means 16, filter 18, filler/breather 20, liquid level gauge 22, clean out cover 24, clean out cover 26, leveling feet 28 and 30, reservoir 32, cover plate 34, and flange seal 36.

As is known to those skilled in the art, the conventional hydraulic power supply produces from about 80 to about 85 decibels of noise during normal operation. A decibel is equal to ten times the common logarithm of the ratio of two like quantities proportional to power or energy; see, e.g., A.S.T.M. C-634.

A reduction of 3 decibels in the sound produced in an environment amounts to about a 50 percent decrease in the sound produced. A six decibel reduction, thus, amounts to a decrease of about 75 percent.

In one embodiment, applicant's apparatus and process decrease the noise level commonly produced by hydraulic powers supplies by at least 6 decibels. In another embodiment, the use of applicant's invention decreases the noise produced by at least 9 decibels.

Referring again to FIG. 1, hydraulic power supply 10 is preferably comprised of an electric motor 12 which rotates at a speed of less than about 1,800 revolutions per minute. It is preferred that power supply 10 be comprised of means for rotating a rotary output shaft 38 (see FIG. 2) at a speed of less than about 1,500 revolutions per minute. In an especially preferred embodiment, the electric motor rotates the rotary output shaft at a speed of less than about 1,200 revolutions per minute. In an even more preferred embodiment, the electric motor operates at a speed of less than about 1,000 revolutions per minute.

In one embodiment, it is preferred that electric motor 12 produce from about 3 to about 5 horsepower per unit of time and a torque of from about 12 to about 30 foot pounds. In general, when the torque produced by motor 12 is divided by the horsepower of the motor, under the conditions of operation, the ratio of the two is preferably at least about 4.0.

Those skilled in the art are aware that many electric motors which have speeds of 1200 r.p.m. or less, which are from 3 to 5 horsepower, and which provide a full load torque of from about 18 to about 30 foot pounds, are commercially available. Thus, by way of illustration, The Lincoln Electric Company of Cleveland, Ohio published Bulletin E7, "Lincoln Motors," in November of 1980. Referring to page 6 of this Bulletin, the following 60-hertz motors could be used: model 213T (3 horsepower, 1200 r.p.m., 13.5 foot pounds of full load torque), model 215T (3 horsepower, 900 r.p.m., 18.1 foot-pounds of full-load torque), model 215T (5 horsepower, 1200 r.p.m., 22.4 foot-pounds of full load torque), model 254T (5 horsepower, 900 r.p.m. 30.2 foot pounds of full load torque). Thus, by way of further illustration, one may also use 50 hertz IEC ("International Electrical Code)__ motors from the same company or from manufacturers such as, e.g., Brooks-Crompton—General Electric Company of England.

Thus, by way of further illustration, one may purchase Delco industrial motors from Delco distributors such as, e.g., the Vanderlinde Electric Corporation of 100 Charlotte Street, Rochester, N.Y. 14607.

Figure 2:
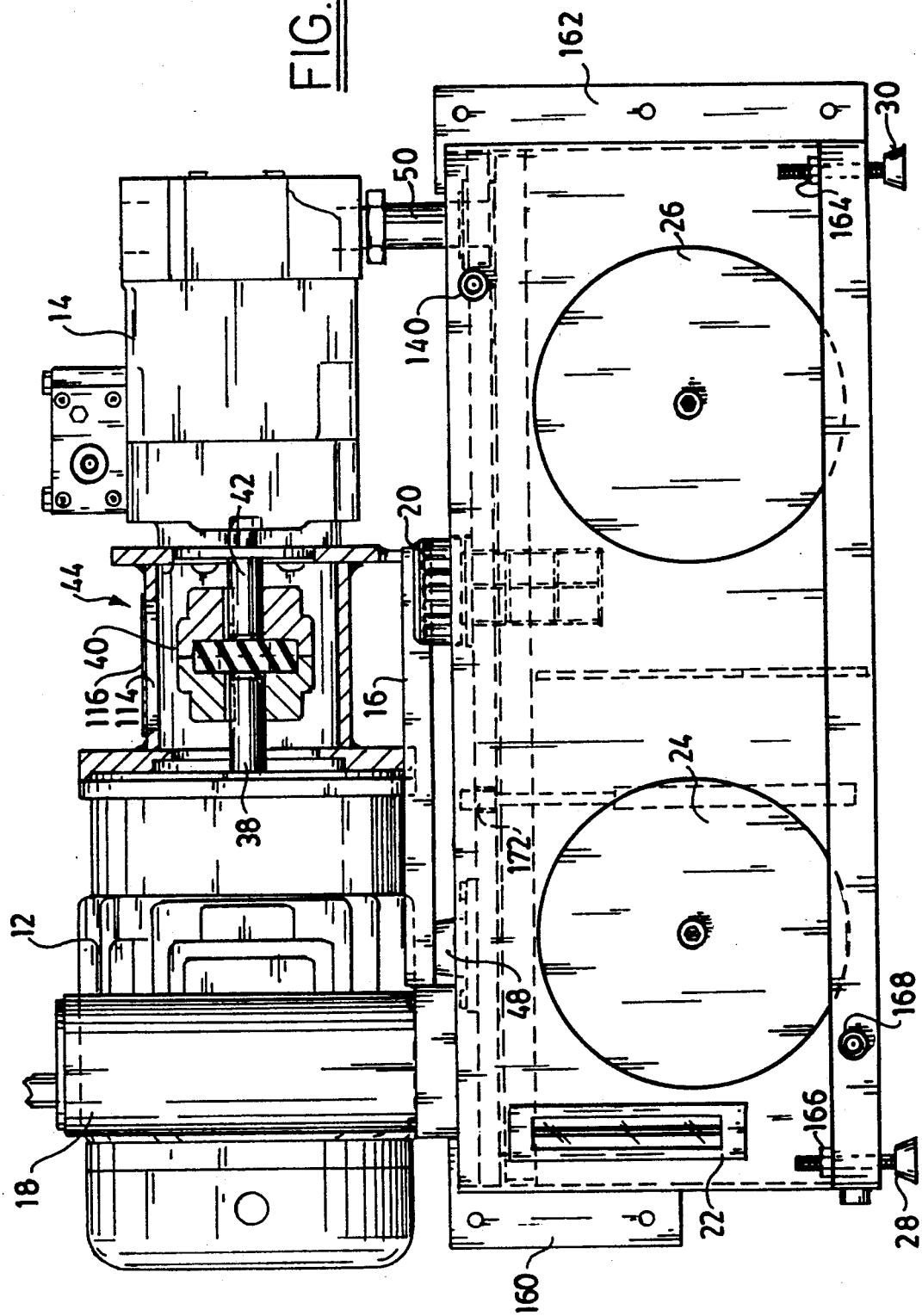
FIG. 2 is a front, partial sectional view of the supply of FIG. 1.

Referring to FIG. 2, it will be seen that output shaft 38 of motor 12 is connected by coupling 40 to pump input shaft 42 of pump 14.

In the preferred embodiment illustrated in FIG. 1, pump 14 is a variable volume pressure compensated pump.

As is known to those skilled in the art, variable volume pumps contain means for varying the volume of fluid output depending upon flow required from the pump. These pumps are well known to those skilled in the art and are described, for example, in U.S. Pat. Nos. 5,085,051 (load sensing pump), 5,077,975 (load sensing pump), 5,007,599 (variable displacement pressure compensated pump), 4,967,557 (variable volume pressure compensated pump), 4,958,989 (variable volume pressure compensated pump), 4,914,913 (variable volume pressure compensated pump), 4,911,330 (variable volume pressure compensated pump), 4,715,788, 4,293,284, 5,081,839, 4,976,106, and the like. The disclosure of each of these United States patents is hereby incorporated by reference into this specification.

Pump 14, in addition to being a variable volume pump, also preferably is pressure compensated. As is known to those skilled in the art, pressure compensated pumps comprise means for varying the amount of fluid flow produced by the pump, depending upon the fluid pressure in the flow output line. When this type senses a fluid pressure in the output line lower than the preset required pressure, it will increase the fluid flow; conversely, it will decrease fluid flow as it approaches the required maximum pressure.

It is preferred to utilize a pump 14 which, when its input shaft is rotated at a speed of less than about 1,200 revolutions per minute, produces less than about 70 decibels of noise.

Variable volume pressure compensated pumps which meet the aforementioned noise requirement are readily available. Thus, by way of illustration, one may purchase a Oilgear "HYDURA" pump from The Oilgear Company of 2304 south 51st Street, Milwaukee, Wis. 53219. Referring to Bulletin 47015B, which was Reissued in the Winter of 1990 by The Oilgear Company, one may order a PVWH open loop pump such as, e.g., PVWH-15LSAY-CNN-138B pump. As is known to those skilled in the art, the PVWH open loop pumps have a quiet plate design which minimizes noise at typical electric valve plate design which minimizes noise at typical electric motor speeds.

By way of further illustration, one may use a Rexroth pump (obtainable from the Rexroth Company of Allentown, Pa.), model number A10V5028DFR/3X-RPPA12N00). One may also use a Vickers pump (obtainable from the Vickers Company of 5445 Corporate Drive, Troy, Mich.), model number PVQ32MBRSSNS10CM11S3.

Referring again to FIG. 1, and in the preferred embodiment illustrated therein, the motor 12 and the pump 14 are supported by mounting means 16. Mounting means 16 is connected to adaptor 44, and each of the motor 12 and the pump 14 is also connected to adaptor 44. There is no direct support means connecting either motor 12 or pump 14 with the cover plate 34 of the power supply; thus, any vibrations caused by the operation of the motor and/or the pump must be transmitted to the cover plate 34 through the adaptor 44 and, in turn, the mounting means 16. Because cover plate 34 is separated from mounting means 16 by isolation mounts 46 and 48 (and others not shown in FIG. 1), the noise produced by operation of power supply 10 is minimized.

Referring again to FIG. 1, a suction line 50 extends from beneath face plate 34 to pump 14. However, as will be apparent to those skilled in the art, this conduit 50 is not a support means and is not adapted to bear any substantial amount of weight. As used in this specification, the term support means refers to a device adapted to support a weight of at least about 10 pounds without deforming.

Without wishing to be bound to any particular theory, applicant believes that the fact that both motor 12 and pump 14 are suspended from adaptor 44, and that neither motor 12 nor pump 14 is directly connected by a support means to the frame of the power supply, is an important factor in minimizing the amount of noise produced the unit.

Figure 3:
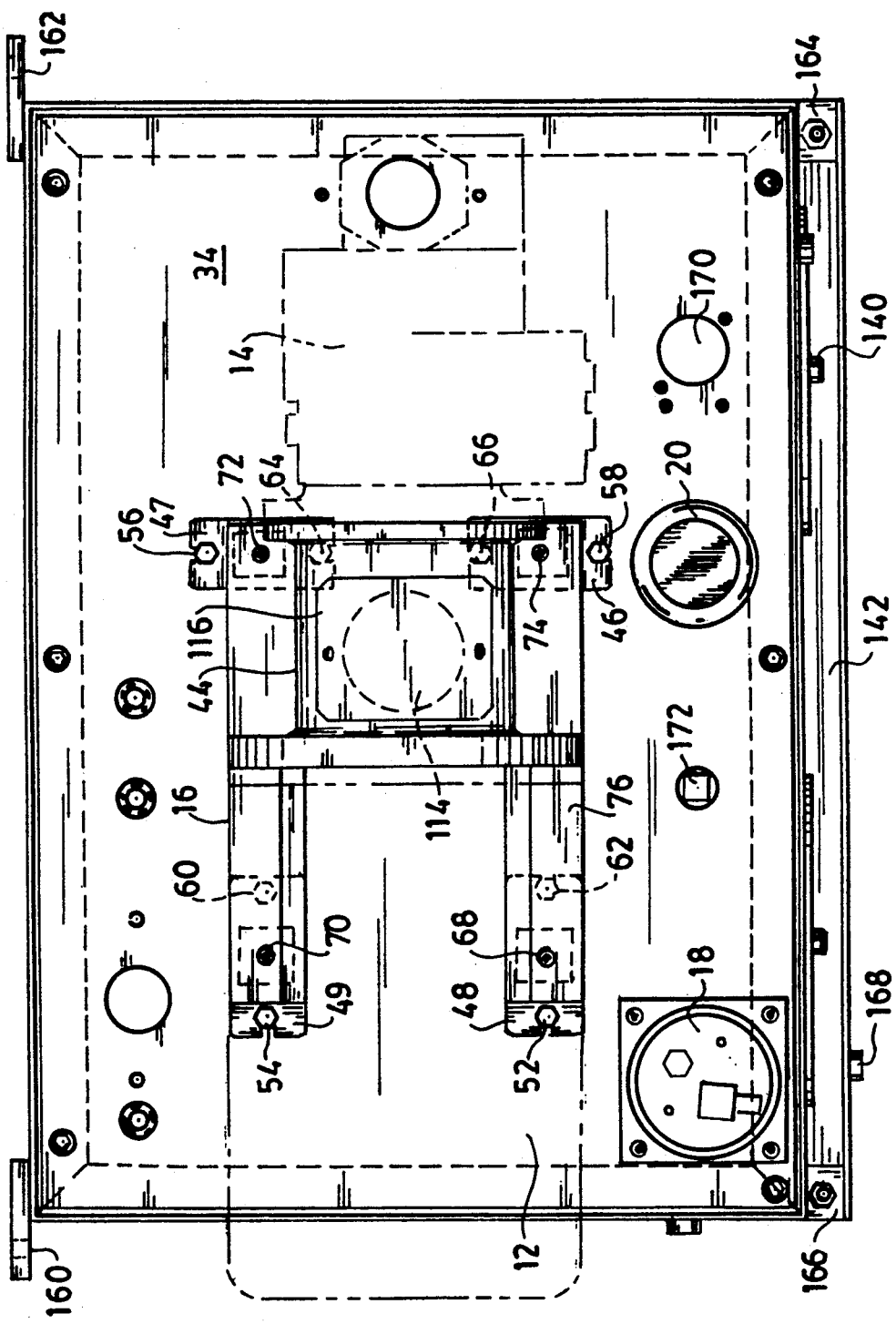
FIG. 3 is a top view of the supply of FIG. 1.

FIG. 3 is a top view of the power supply of FIG. 1, with motor 12 and pump 14 in phantom. Referring to FIG. 3, it will be seen that yoke 16 is connected to cover plate 34 by means of fasteners 52, 54, 56, 58, 60, 62, 64, and 66. The heads the these fasteners, which may be steel machine screws, preferably contact rubber isolation mounts 46, 47, 48, and 49; and the bottom portions of the shanks of these fasteners engage the surface of the cover plate 34.

The rubber isolation mounts 46, 47, 48, and 49 are connected to the underside of the yoke 16 by conventional means such as, e.g., by steel machine screws 68, 70, 72, and 74 which extend through the top surface 76 of yoke 16, and into one of the isolation mounts. Thus, any vibration which is created in yoke 16 tends to be absorbed by an isolation mount and not be transmitted to cover plate 34.

Any of the isolation mounts known to those skilled in the art may be used in applicant's device. Thus, for example, one may use a "KORFUND" isolation mount which may be obtained from the Mechanical Sales Company of 13751 West Eleven Mile Road, Oak Park, Mich. 48337. Thus, for example, one may use any of the isolation mounting devices described in U.S. Pat. Nos. 5083,756, 5,052,510, and the like. The disclosure of each of these patents is hereby incorporated by reference into this specification.

FIGS. 14, 16, and 17 illustrate how adaptor 44 is supported on yoke 16. Referring to FIG. 14, it will be seen that yoke 16 is comprised of mounting holes 78, 80, 82, and 84 through which machine screws 68, 70, 72, and 74 may be inserted in order to fasten them to their respective isolation mounts.

Yoke 16 is preferably an integral assembly, made of steel, which is comprised of cross-rails 86 and 88 and horizontal rails 90 and 92.

Adaptor 44 is shown in phantom in FIG. 16. Referring to FIG. 16, it will be seen that adaptor 44 is comprised of a proximal plate 94, a distal plate 96, and a tube 98 connecting plate 94 and 96. Plate 94, tube 98, and plate 96 are preferably welded together to form an integral assembly.

The integral adaptor 44 is then preferably welded to cross plates 86 and 88 in such a manner that the inner face 100 of plate 94 and the inner face 102 of plate 96 are each contiguous with and joined to the outer face 104 of cross plate 86 and the outer plate 106 of cross-plate 88, respectively.

FIGS. 11, 12, and 13 illustrate certain preferred embodiments of adaptor 44, proximal plate 94, and distal plate 96.

Referring to FIG. 11, and in the preferred embodiment depicted therein, it will be seen that proximal plate 94 is adapted to mount either a "NEMA" (National Electrical Manufacturers Association) frame motor, or a IEC frame motor. The NEMA frame motor has a lager pilot and bolt circle than does the IEC frame motor. Thus, the pilot of the NEMA frame motor is adapted to be inserted within collar 108, whereas the pilot of the IEC frame motor is adapted to be inserted within collar 110. Either motor then may be mounted, after such insertion, with the use of threaded fasteners inserted into the appropriate number of mounting holes and secured with suitable fastening means, such as nuts.

Referring to FIG. 12, and in the preferred embodiment depicted therein, adaptor 44 is equipped with an access hole through which one may inspect and/or adjust coupling 40 (not shown in FIG. 12). Referring to FIG. 2, it will be seen that the access hole 114 is covered by a removable access cover 116 which is preferably removably attached to the top of the adaptor 44.

Referring again to FIG. 12, it will be seen that adaptor 44 is preferably comprised of relief notches 118, 120, and 122(as well as other relief notches, not shown). When a threaded fastener (not shown) is inserted into one or more of the mounting holes 124 of plate 96, and when the fastener(s) so used has a length exceeding the width of plate 96, the notches provide a relief for the excess length.

Referring again to FIG. 13, it will be seen that the exterior surface 126 of plate 96 is comprised of a multiplicity of mounting holes 124. Some of these mounting holes are so disposed on surface 126 as to receive mounting fasteners for different pumps such as, e.g., a Vickers, an Oilgear, or a Rexroth pump with a two-bolt ISO (International Standards Organization) pump flange. Although these pumps frequently have the same size pilot, the orientation of the two bolt flanges used on them frequently differs from one pump to another. Thus, in addition to be adapted to mount different electric motors on plate 94, applicant's hydraulic supply also is adapted to mount different hydraulic pumps on plate 96.

Figure 6:
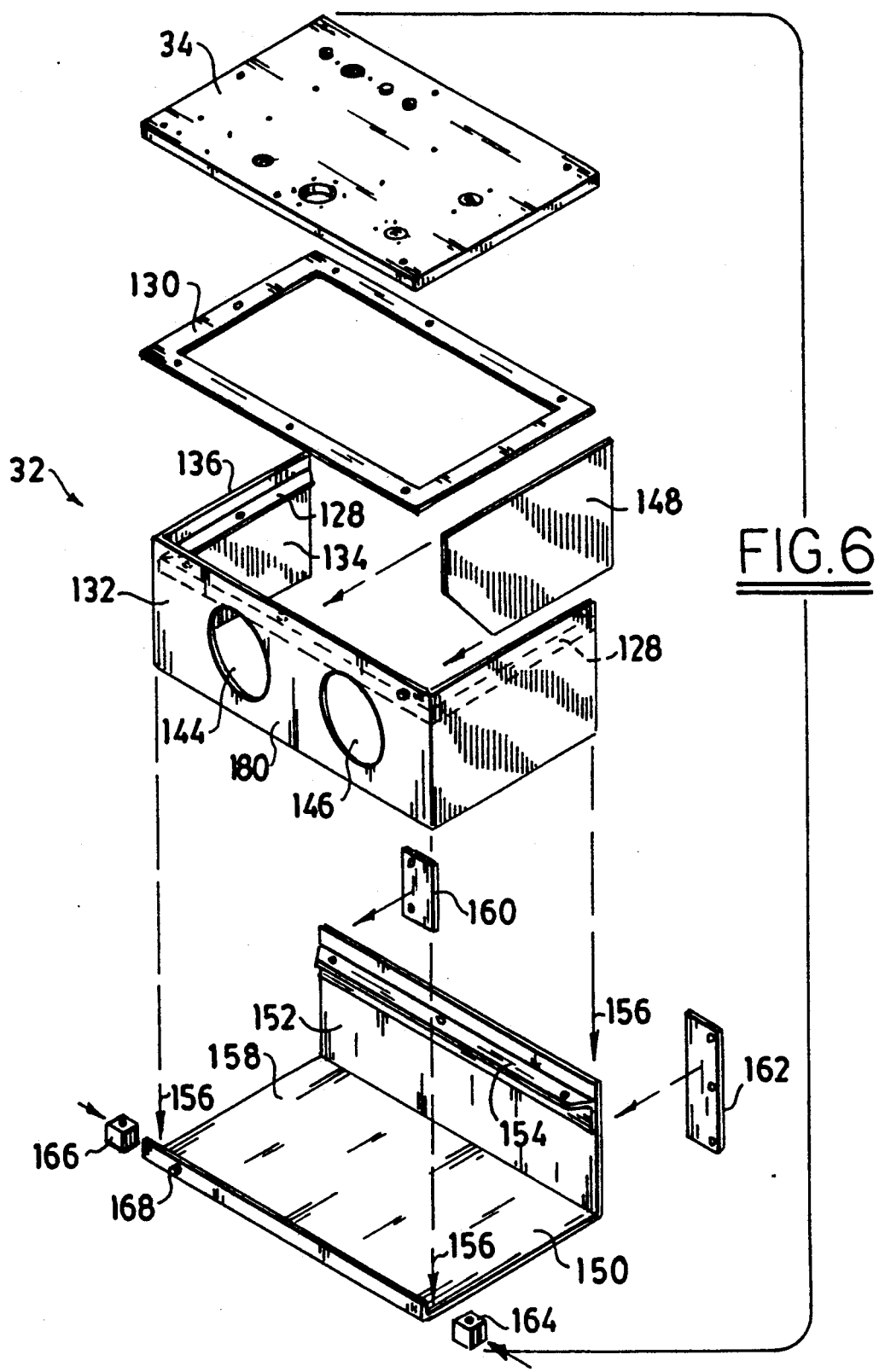
FIG. 6 is an exploded view of the reservoir assembly of the supply of FIG. 1.

FIG. 6 is an exploded view illustrating how the reservoir 32 is preferably constructed.

Referring to FIG. 6, it will be seen that cover plate 34 is comprised of a multiplicity of orifices adapted to receive the fasteners. described elsewhere in this specification.

Disposed below cover plate 34, and contiguous with both such cover plate and ledge 128, is flexible gasket 130 which may, e.g., consist essentially of rubberized cork. The gasket sits upon ledge 128 of U-shaped wall 132, the cover plate 34 sits on top of the gasket, and both are secured to ledge 128 by fasteners (not shown).

As will be seen from FIG. 6, ledge 128 extends around the inside wall 134 of U-shaped structure 132. Inasmuch as the cover plate is spaced from ledge 128 by gasket 130, and because cover plate sits some distanced below the top 136 of structure 132, a continuous lip 138 is formed by the intersection of cover plate 34 and structure 132 (see FIG. 1). This lip 138 tends to prevent any hydraulic liquid which congregates on the top of cover plate 34 from spilling over the side of the unit 10. Referring again to FIG. 1, if any hydraulic fluid does congregate in the inside of the reservoir drip lip 138, it is able to drain out of drain hole 140. Any such hydraulic fluid draining out of drain hole 140 will tend to be caught by lower drain lip 142 (also see FIG. 1).

Referring again to FIG. 6, U-shaped device 132 is comprised of orifices 144 and 146 which are adapted to receive clean out covers 24 and 26, respectively.

Baffle 148 extends from the back to the front of reservoir 32. It is preferably disposed between orifices 144 and 146 and is contiguous with the bottom surface 150, the back surface 152, and the front surface (not shown) of the interior walls of reservoir 32. It is preferably welded in place against these surfaces.

Referring again to FIG. 6, lip is adapted to be substantially contiguous with the three sided lip 128 of structure 132 so that, when said structure 132 is slid into place in the direction of arrows 156, a composite lip (not shown) will extend completely around the inner perimeter of the reservoir 32 formed by the joining of U-shaped device 132 with side/back member 158. As will be apparent to those skilled in the art, members 132 and 158 may be joined by conventional means with the use of, e.g., mounting bracket 160 and mounting bracket 162, blanking block 164, and blanking block 166.

The reservoir formed by the process illustrated in FIG. 6 is best shown in FIG. 1. It will be noted that, in the embodiment depicted, lower lip 142 is also preferably provided with a drain hole 168.

Referring to FIG. 1, it will be seen that orifice 170 is adapted to receive either of at least two different float level switches. It will also be seen that, in this embodiment, magnet 172 extends downwardly from the top of cover plate 34 to within the reservoir 32. Any metal-containing waste material will tend to be attracted and trapped by magnet 172.

Referring again to FIG. 1, suction line 50 extends through an orifice (not shown) in cover plate 174. Cover plate 174 is not perfectly square, and the orifice in said cover plate is not located in the precise center of this plate. By orienting the plate in one position, it is adapted to receive the suction line of one pump (such as a Vickers pump, e.g.). By orienting the plate in another position, it is adapted to receive the suction of a different pump, such as the Oilgear pump.

Figure 4:
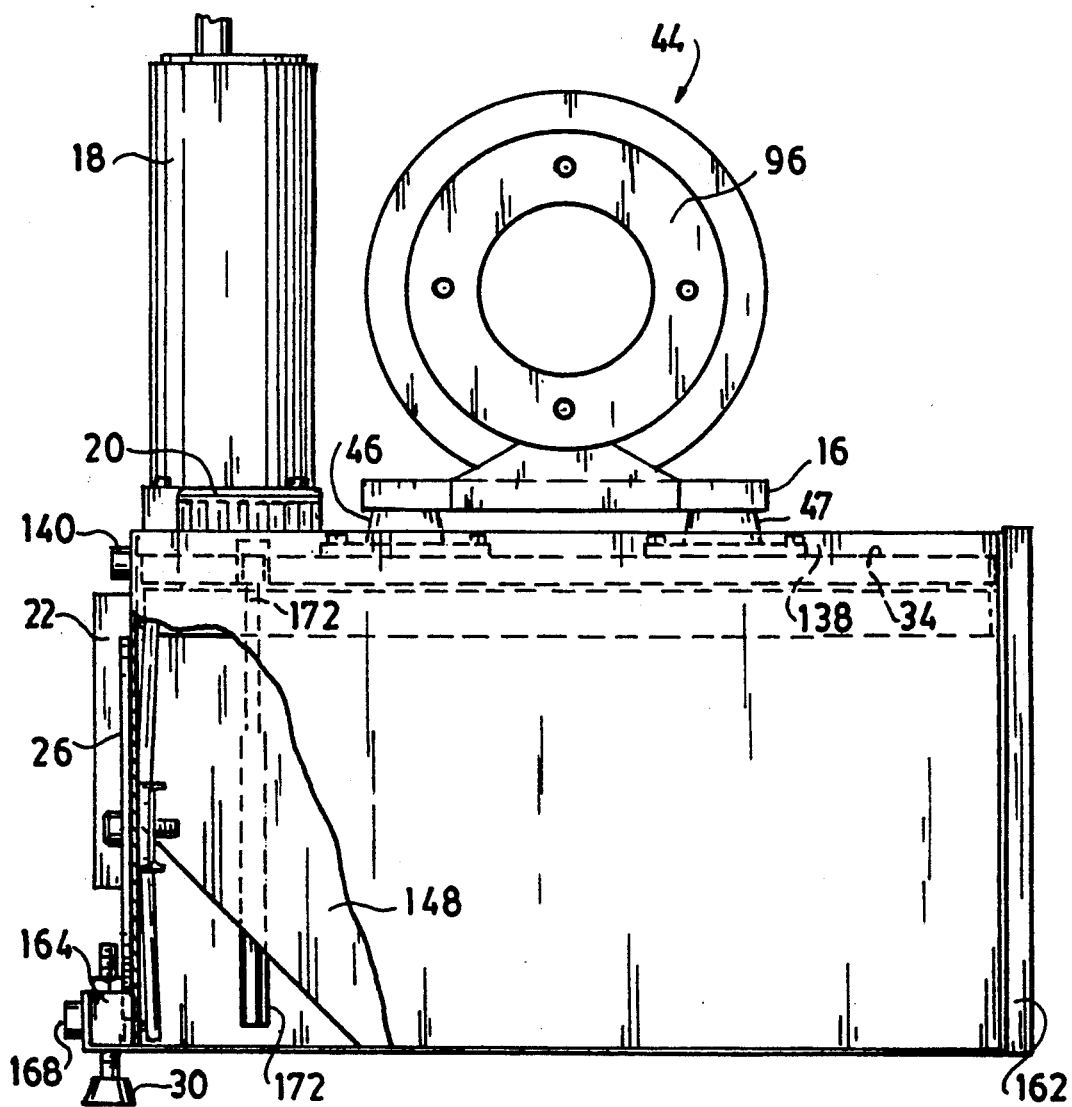
FIG. 4 is a side, partial sectional view of the supply of FIG. 1.
Figure 5:
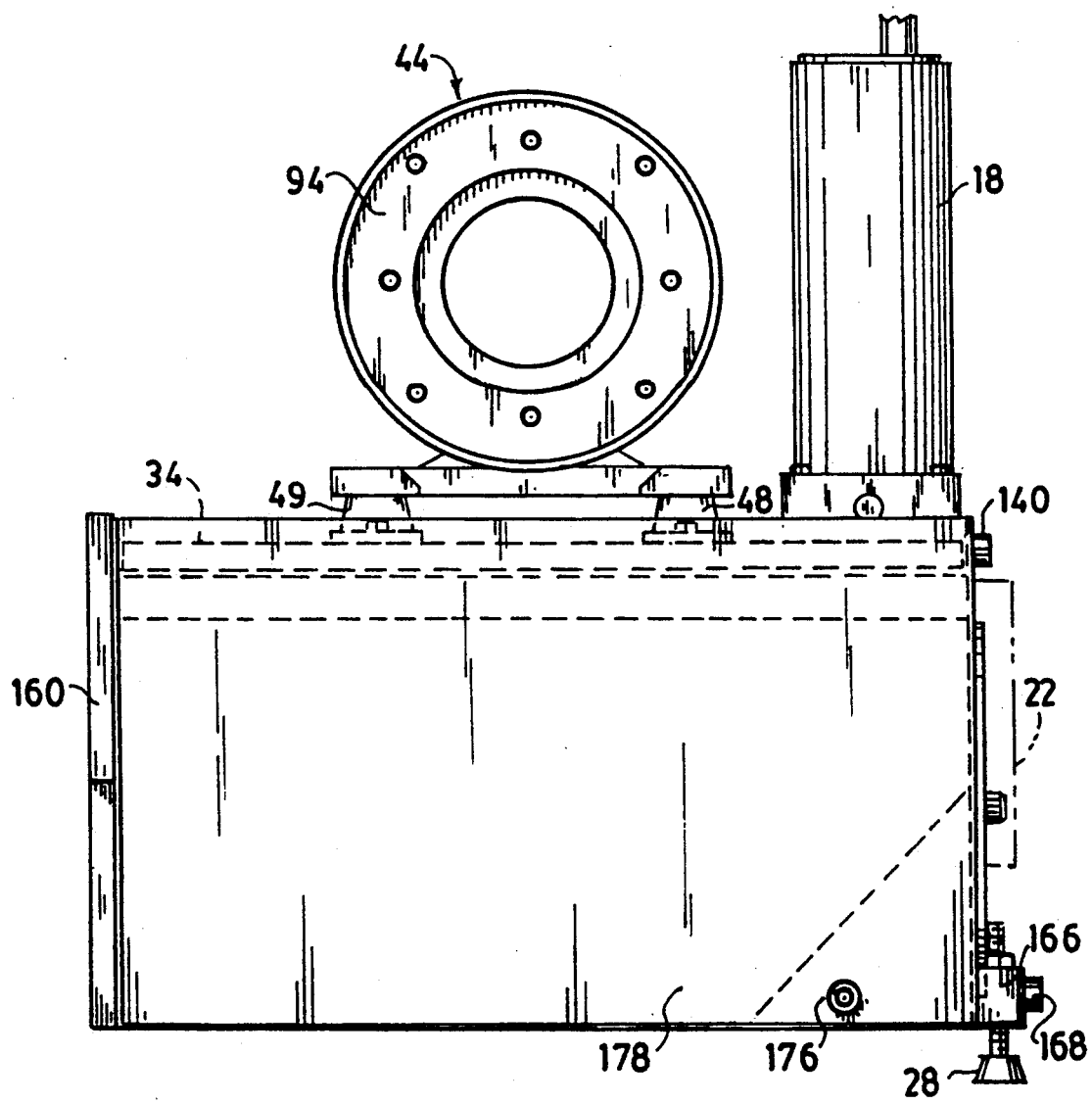
FIG. 5 is another side view of the supply of FIG. 1.

FIG. 4 is a side view of fluid power supply 10, partially broken away to illustrate magnet 172 and baffle. FIG. 5 is the opposite side view of fluid power supply 10, illustrating drain hole 176 which is disposed in the right hand corner of the side wall 178 of the reservoir 32.

FIGS. 7 through 10 illustrate one preferred means of securing cover plates 24 and/or 26 to the front wall 180 (see FIG. 6) of U-shaped device 132. In this preferred embodiment, spider 182 is preferably utilized.

Referring to FIG. 7, it will be seen that spider 182 preferably is an integral device formed from channel 184, channel 186, and channel 188 which are welded together to form a substantially cross-shaped section. Spider 182 is comprised of four inwardly-extending spacer tabs, such as tabs 190, 192, 194, and 196.

FIG. 8 is a side view of spider 182. Referring to FIG. 8, it will be seen that spider 182 is preferably comprised of an internally threaded boss 198 adapted to receive fastener 200 (see FIGS. 9 and 10).

Referring to FIG. 10, it will be seen that plate 24 is provided with a recess adapted to receive a washer 204 and the head 206 of fastener 200. The plate 24 also is comprised of an annular groove 208 adapted to receive O-ring 210.

Referring again to FIG. 10, it will be seen that, when plate 24 is disposed within orifice 144 (see FIGS. 1 and 66), the perimeter of the plate is contiguous with wall 180 (see FIG. 6) of reservoir 32. In order to insure a tight fit between these surfaces, fastener 206 is passed through boss 198 and turned until there is contact between surface 180 and the perimeter of plate 24. The pressure caused by tightening the fastener 206 will tend to cause the spider 182 to deform and to cause such contact to exist well.

One advantage of applicant's hydraulic power supply is that it is relatively compact. Thus, referring to FIG. 1, it will be seen that power supply 10 has a length 212 of from about 28 to about 40 inches, a width 214 of from about 19.5 about 23 inches, and a height (measured form the bottom of the leveling foot 28 to the top of the filter 18) of from about 24 to about 32 inches.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A hydraulic power supply comprised of a reservoir, an electric motor, and a variable volume pressure compensated pump, wherein:
    (a) said electric motor is comprised of means for rotating an electric motor output shaft at a speed which does not exceed 1,200 revolutions per minute and for producing from about 3 to about 5 horsepower and a torque of from about 12 to about 30 foot pounds, provided that the ratio of said torque to said horsepower (in foot-pounds per horsepower) does not exceed about 4.0;
    (b) said reservoir is comprised of a multiplicity of walls;
    (c) said hydraulic power supply is comprised of means for connecting said electric motor and said variable volume pressure compensated pump and for suspending said electric motor and said variable volume pressure compensated pump away from at least one of said walls of said reservoir, wherein:
        1. said means for connecting and means for suspending is comprised of an adaptor; and
        2. said adaptor is connected to a frame which, in turn, is connected to a multiplicity of vibration isolation mounting devices; and
        3. said vibration isolation mounting devices are connected to one of the walls of said reservoir.

2. The hydraulic power supply as recited in claim 1, wherein said reservoir has a substantially rectangular shape and is comprised of a top wall and a side wall.

3. The hydraulic power supply as recited in claim 2, wherein said electric motor and said variable volume pressure compensated pump are suspended above said top wall.

4. The hydraulic power supply as recited in claim 1, wherein said motor is comprised of means for rotating an electric motor output shaft at a speed of less than about 1,000 revolutions per minute.

5. The hydraulic power supply as recited in claim 1, wherein said pump, when operated at a speed of 1,200 revolutions per minute, produces less than about 70 decibels of sound.

6. The hydraulic power supply as recited in claim 1, wherein said adaptor is comprised of a first annular plate.

7. The hydraulic power supply as recited in claim 6, wherein said first annular plate is comprised of means for mounting a IEC frame motor.

8. The hydraulic power supply as recited in claim 7, wherein said first annular plate is comprised of means for mounting a NEMA frame motor.

9. The hydraulic power supply as recited in claim 8, wherein said adaptor is comprised of a second annular plate.

10. The hydraulic power supply as recited in claim 9, wherein said second annular plate is comprised of means for mounting at least two different types of pumps with a two-bolt ISO pump flange.

11. The hydraulic power supply as recited in claim 10, wherein said motor is comprised of means for rotating an electric motor output shaft at a speed of less than about 1,000 revolutions per minute.

12. The hydraulic power supply as recited in claim 11, wherein said pump, when operated at a speed of 1,200 revolutions per minute, produces less than about 70 decibels of sound.

* * * * *